Oct. 29, 1935.   J. W. WATSON   2,019,440

HYDRAULIC FLOW REGULATING DEVICE

Filed March 2, 1933

Inventor
John Warren Watson
by his Attorneys
Howson & Howson

Patented Oct. 29, 1935

2,019,440

UNITED STATES PATENT OFFICE 2,019,440

HYDRAULIC FLOW-REGULATING DEVICE

John Warren Watson, Wayne, Pa., assignor to John Warren Watson Company, Philadelphia, Pa., a corporation of Pennsylvania Application March 2, 1933, Serial No. 659,428

5 Claims. (Cl. 188—89)

This invention relates broadly to improvements in the means for restricting and resisting the flow of a liquid from one chamber to another.

A particular object of the invention is to provide a form of restriction or valve which will resist, with minimum variation, the flow of liquids of varying viscosities.

The viscosity of the oils used, for example, in hydraulic shock absorbers varies with every change in temperature. Heretofore, with a restriction or orifice of fixed area, these changes in viscosity which bring about changes in coefficient of friction resulted in very marked changes in the resistance to the flow of the liquid and hence in the resistance produced by the shock absorber.

To overcome these objections and to provide a more or less constant resistance to the flow of liquids of varying viscosities, it has been the practice to vary the area of the restriction as for example by means of thermostatically actuated valves.

I have found that very uniform results, despite widely varying viscosities, may be obtained even with a restricting orifice of fixed area. I accomplish this by forming the fixed area in a manner which reduces to a minimum the items of friction. There are two items of friction set up in forcing a liquid through a restricting orifice. One item is that of skin friction between the oil and the orifice wall and the other item is friction within the oil itself caused by turbulence.

In the forms of restricting orifices illustrated in the present embodiment of my invention it will be seen that both of these friction items have been reduced to a minimum. Hence it is that changes in viscosity and co-efficient of friction have so little effect on the resistance to flow. To take care of the first item of friction, skin friction, I have reduced the length of wall area to a mere line. In other words, the wall area at the point of restriction has no length. To take care of the second item of friction, internal friction aggravated by turbulence, I have provided for a true stream line of flow as the liquid enters and leaves the restriction and thus reduce cross currents and turbulence of flow.

Figure 1:
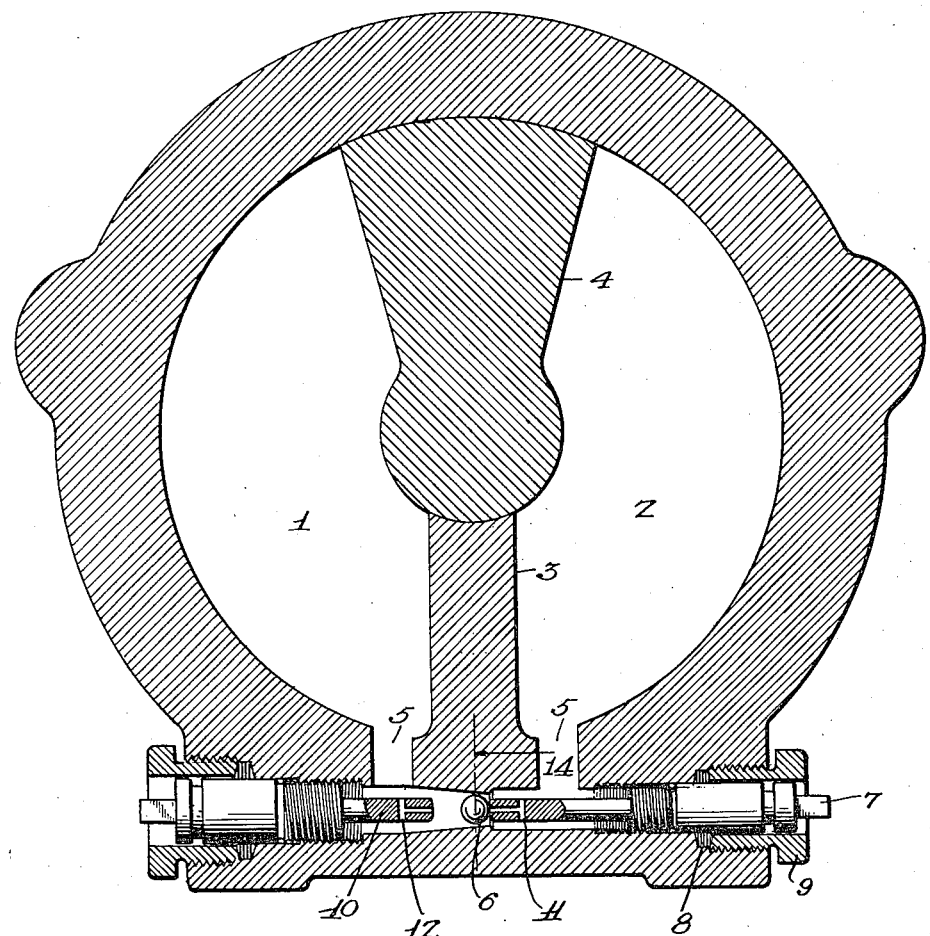
Figure 2:
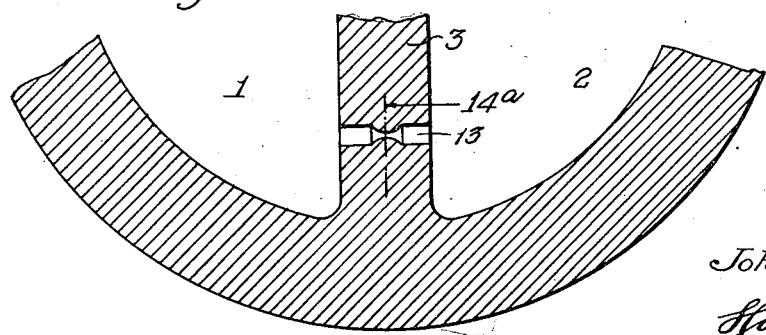

Two embodiments of my invention are shown in the accompanying drawing in which Figure 1 is a sectional view of a shock absorber of more or less conventional design well known in the shock absorber art, and Fig. 2 is a fragmentary sectional view illustrating a preferred form of fixed orifice. This design is diagramatic merely to serve the purpose of showing a shock absorber or other hydraulic mechanism comprising two working chambers 1 and 2 which are separated from each other by the wall 3 and the oscillating vane 4. These two working chambers in the embodiment shown in Fig. 1 are connected by a suitable passage 5—5 including a restriction to the flow of liquid from one chamber to the other.

In this embodiment of my invention, wherein I employ the ball member 6 in the passage 5—5 the length of the wall area of the governing restriction has been reduced to a mere line (indicated in broken line at 14) which of course is the minimum length possible. Also the ball provides a perfect stream line flow and thus reduces turbulence to a minimum. The position of the ball may be adjusted with relation to the tapered portion of passage 5—5 in a manner to get any desired area of orifice and hence any desired velocity of flow to bring about the required resistance. This desired positioning of the ball is accomplished by screwing pin member 7 in or out in the threads provided for that purpose. 8 is a packing member and 9 a gland for tightening the packing around pin member 7. The ball is now shown in position to resist flow of the liquid from chamber 1 to chamber 2 as the oscillating vane 4 is rotated in a counterclockwise direction. When the oscillating vane 4 is rotated in a clockwise direction the flow of liquid is then from chamber 2 to chamber 1 which moves the ball over against pin 10 which, like pin 7, may be adjusted to hold the ball in any desired position along the tapered passage and thus set up the desired velocity of flow in that direction and hence the desired resistance to movement of the oscillating vane in the clockwise direction. Passages 11 and 12 in pins 7 and 10 respectively are for the purpose of unbalancing the pressures on the front and back of the ball in order to hold the ball snugly against the pin and thus prevent it from gyrating and causing noise.

To suit the invention to some other arrangement of parts as may be governed by the specific shock absorber or other hydraulic device, where it may not be practical or desirable to use the ball shaped restriction, the same minimum of wall length of the governing restriction, and the same freedom from turbulent flow may be accomplished by rounding out or counter-sinking a hole through any wall or plate member dividing the chambers as is here, by way of example, alternately shown at 13 in wall 3 of Fig. 2. According to the thinness of such a dividing wall or plate or to the depth of rounding or countersinking, the wall length of the governing restriction may be brought down to the very minimum of a line, as indicated at 14a, or to any desired or practical degree approaching that minimum.

Having thus illustrated and described my invention, what I claim and desire to protect by Letters Patent of the United States is:

1. In mechanism for resisting a force, two chambers, a passage connecting said chambers, a liquid in one of said chambers, means for causing said liquid to flow from said chamber through said passage to said other chamber, a restricting orifice of constant area in said passage to govern said flow, said passage having a wall portion curving continuously toward and up to said restricting orifice, and means in said passage constructed and arranged to unbalance the pressures at each side of said continuously curving wall portion.

2. In mechanism for resisting a force, two chambers, a passage connecting said chambers, a liquid in one of the chambers, means for causing said liquid to flow from said chamber through said passage to the other chamber, a restricting orifice of constant area in the passage to govern said flow, means in said passage providing a continuously curving wall portion therein toward and up to said restricting orifice, and means in the passage operable to unbalance the pressures at each side of said last mentioned means.

3. In mechanism for resisting a force, two chambers, a passage connecting said chambers, a liquid in one of the chambers, means for causing said liquid to flow from said chamber through said passage to the other chamber, a restricting orifice of constant area in the passage to govern said flow, means movable in said passage and providing a continuously curving wall portion therein toward and up to said restricting orifice, means limiting movement of said last mentioned means, and means associated with said limiting means operable to unbalance the pressures at each side of the means providing the continuously curving wall portion in said passage.

4. In a mechanism for resisting a force, two chambers, a passage connecting said chambers, a liquid in one of the chambers, means for causing said liquid to flow from said chamber through said passage to the other chamber, a restricting orifice of constant area in the passage to govern said flow, a ball movable in said passage and providing a continuously curving wall portion therein toward and up to said restricting orifice, and means also in the passage operable to unbalance the pressures at each side of said ball.

5. In a mechanism for resisting a force, two chambers, a passage connecting said chambers, a liquid in one of the chambers, means for causing said liquid to flow from said chamber through said passage to the other chamber, a restricting orifice of constant area in the passage to govern said flow, a ball movable in said passage and providing a continuously curving wall portion therein toward and up to said restricting orifice, and means for adjustably limiting movement of said ball, said last mentioned means having passages therein operable to unbalance the pressures at each side of the ball.

JOHN WARREN WATSON.